UNITED STATES PATENT OFFICE.

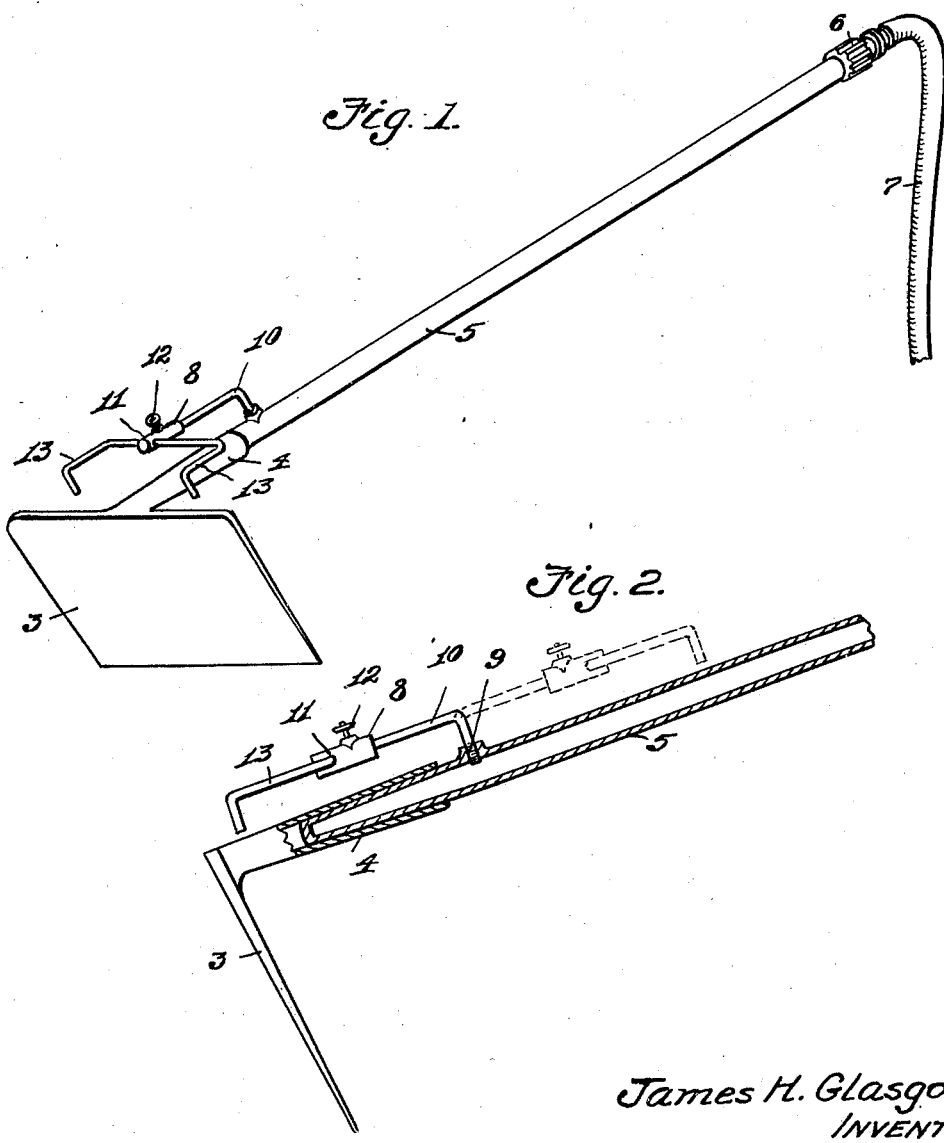

JAMES H. GLASGOW, OF SOUTH BEND, INDIANA.

FOUNTAIN MIXING TOOL.

1,408,584. Specification of Letters Patent. Patented Mar. 7, 1922.

Application filed January 23, 1920. Serial No. 353,520.

*To all whom it may concern:*

Be it known that I, JAMES H. GLASGOW, a citizen of the United States, residing at South Bend, in the county of St. Joseph and State of Indiana, have invented certain new and useful Improvements in Fountain Mixing Tools, of which the following is a specification.

The invention relates primarily to the provision of means in connection with a mixing tool, such as a hoe, rake or similar device, whereby the substance or ingredients to be mixed by the use of the tool, may, in the manipulation of the tool, be at the same time supplied with the liquid substance entering into the composition.

The object of the invention resides in providing a mixing tool, such as a hoe, with a sprinkler attachment, whereby water or other liquid may be continuously and in the required volume supplied to the mixture as the tool is being manipulated, whereby the mixing operation may be performed in a more expeditious manner, and the desired consistency of the mixture more nearly approximated. Thus, for example, in mixing mortar, the workman relies on his judgment as to the amount of water to be added to the cement and sand from time to time during the mixing operation, which ordinarily means the dropping of the hoe periodically to perform the act of adding water from time to time, with the possibility through misjudgment of adding too much water, and with a resultant waste of time in performing said steps. With the present improvement the workman may continuously manipulate the hoe and easily observe and judge when the mixture is of the desired consistency, and with a material saving of time and labor over said method, which is of common practice.

The invention in the preferred form of details will be described in the following specification, reference being had particularly to the accompanying drawings, in which:

Figure 1 is a perspective view showing a hoe embodying my improvement.

Figure 2 is an enlarged view of the lower end thereof, partly in section.

In the drawings the reference numeral 3 designates the blade of a hoe of the conventional form, provided with an integral formed hollow tapering tang 4, for the reception of a tubular metal handle 5, the lower end of which is closed, and the outer end of which is provided with a coupling 6 for attachment with a water supply hose 7.

Mounted upon the handle 5 adjacent the blade of the hoe is a sprinkler element 8, having screw-threaded connection with the handle at 9, as in the manner shown. The sprinkler part 10 consists of a bent pipe, the longer arm of which is disposed in substantial parallelism with the handle, and is terminally provided with a cap 11, provided with a suitable valve 12 for controlling the flow of water through the sprinkler. Tapped into the cap beyond the valve are opposed laterally extending nozzles 13, the outer portions of which are bent forwardly and downwardly so as to direct a stream downwardly on each side of the tang of the blade, and preferably at an angle with relation to the blade so as to impinge against the inner face thereof, whereby the streams will be caused to spread and flow down the blade in the form of a film, thus more quickly and evenly distributing the water in the mixing operation than would obtain by directing solid streams of water into direct contact with the dry material forming a part of the mixture. Also, by means of the valve 12, the flow of the water may be regulated to a nicety, so that, by the time the ingredients have been adequately mixed, the proper quantity of water will have been added to bring the mass to the desired consistency. As shown by dotted lines in Fig. 2, the sprinkler, due to its threaded connection with the handle, may be swung away from the blade of the hoe, so that the flow of the water will be more remote from the operative end of the hoe or tool, or so that the sprinkler will not interfere with the use thereof for purposes not requiring the application of water or other fluid.

While my improvement is herein shown and described as applied to a hoe, it is obvious that the same is equally as well adapted for use in connection with other mixing tools, and it is therefore to be understood that I do not limit myself to the precise structure or embodiment shown and described.

Having thus described my invention, what is claimed is:

1. A mixing tool or the like comprising a mixing member, a tubular handle, means for coupling the handle with a source of liquid supply, and a sprinkler in communication with the handle and having a swivel connection therewith to permit adjustment thereof toward or from the mixing member.

2. A mixing tool or the like comprising a mixing member, a tubular handle, means for coupling the handle with a source of liquid supply, and a sprinkler in communication with the handle having a swivel connection therewith for adjustment thereof toward and from the mixing member, said sprinkler having a plurality of downwardly directed discharge nozzles.

3. A mixing tool or the like comprising a mixing member, a tubular handle, means for coupling the handle with a source of liquid supply, and a sprinkler mounted upon and having communication with the handle, and means of connection between the sprinkler and the handle whereby the discharge end thereof may be moved toward and from the mixing member.

In testimony whereof I affix my signature.

JAMES H. GLASGOW.